J. P. WEBER.
VEHICLE FRONT WHEEL BRAKE.
APPLICATION FILED JAN. 23, 1915.
1,181,814.
Patented May 2, 1916.
2 SHEETS—SHEET 1.
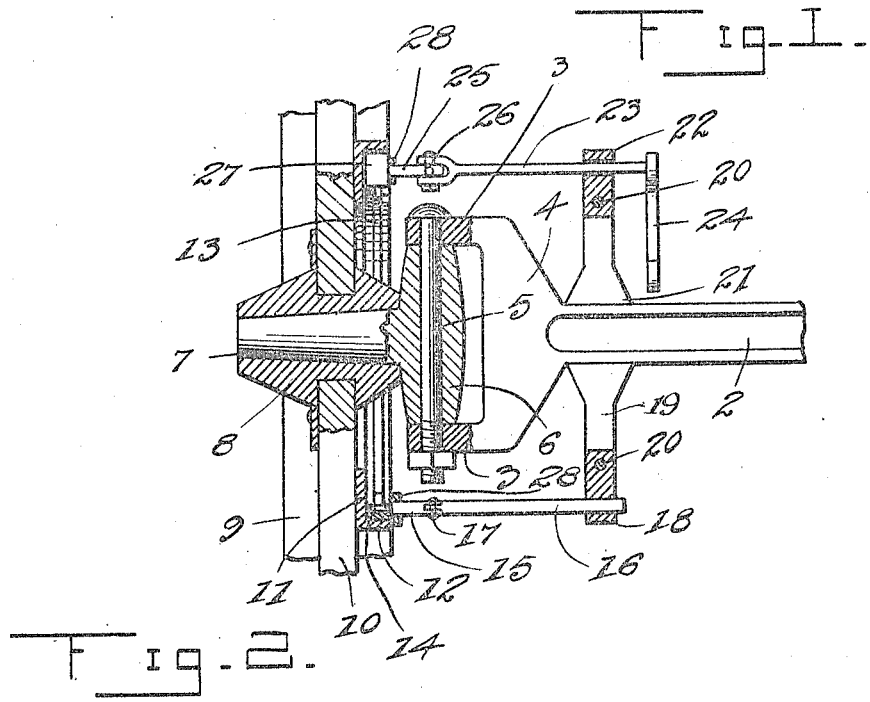
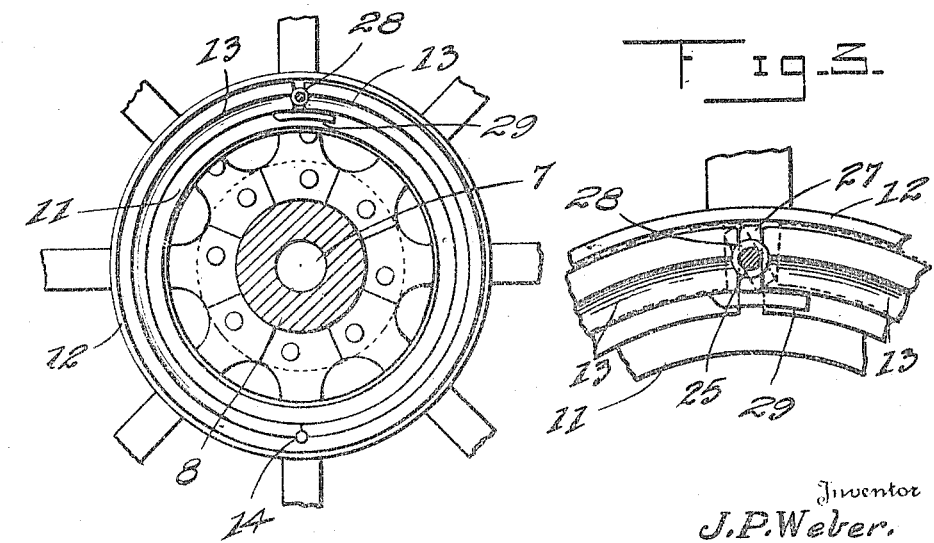
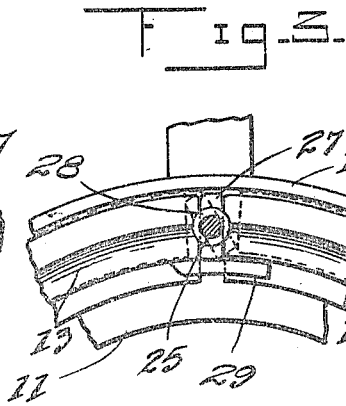
Witnesses
C. R. Beall
J. F. Byrne
Inventor
J. P. Weber.
By [signature]
Attorney

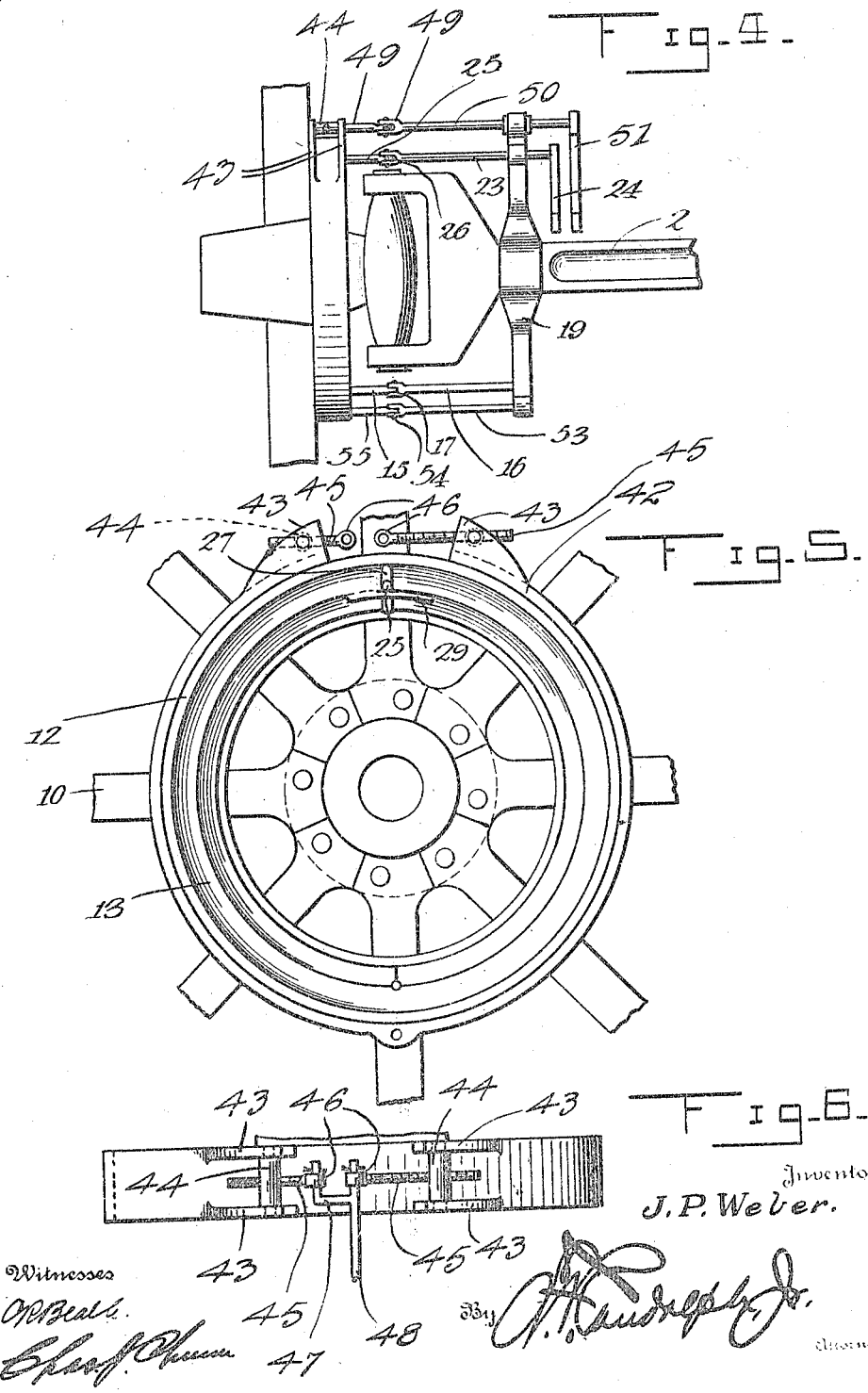

UNITED STATES PATENT OFFICE.

JOHN PH. WEBER, OF SAN BERNARDINO, CALIFORNIA, ASSIGNOR OF ONE-HALF TO STANLEY H. MILLER, OF SAN BERNARDINO, CALIFORNIA.

VEHICLE FRONT-WHEEL BRAKE.

1,181,814.                Specification of Letters Patent.        Patented May 2, 1916.

Application filed January 23, 1915. Serial No. 3,940.

*To all whom it may concern:*

Be it known that I, JOHN PH. WEBER, a citizen of the United States, residing at San Bernardino, in the county of San Bernardino and State of California, have invented certain new and useful Improvements in Vehicle Front-Wheel Brakes; and I do hereby declare the following to be a full, clear, and exact description of the invention, such as will enable others skilled in the art to which it appertains to make and use the same.

This invention comprehends certain new and useful improvements in front wheel brakes for vehicles, and has for its primary object to provide a brake of this character which will be especially adapted for the front wheels of automobiles and will be of extremely simple construction, as well as highly efficient and durable in use.

The invention has for another object to provide a brake of this character in which the band or bands may be tightened against the brake drum by the expansion or contraction thereof, or both.

The invention has for another object to provide a brake of this character which will be of such construction and operation that it may be readily applied to wheels mounted upon stub axles or knuckle joints without interfering with the proper operation of the wheels.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawings, in which—

Figure 1 is a vertical transverse section through one of the wheels and the brake mechanism applied to the same, Fig. 2 is an elevation of the central portion and hub of the wheel, looking at the brake drum and brake band mounted in the same, Fig. 3 is an enlarged elevation of a portion of the brake band and drum to show the spreading member in proper position between the free ends of the sections of said brake band, Fig. 4 is a fragmentary side elevation of a modified form of my device, Fig. 5 is a front elevation of the device of a modified form, and Fig. 6 is a top plan view of the modified form.

Referring in detail to the drawings by numerals, 2 designates the axle of a vehicle, upon the opposite ends of which are formed the upper and lower parallel spaced perforated ears 3 extending outwardly from the large extremities 4 of said axle 2 and constituting one part of a knuckle joint. It will be understood that the axle 2 is preferably the front axle of the automobile, and secured through the ear 3 is the vertical knuckle pin 5, upon which the vertical sleeve 6 of the knuckle or stub axle 7, is mounted between said ears 3. The knuckle or stub axle 7 serves as supporting means for the hub 8 of an ordinary front wheel 9, and it will be understood that the wheel may be secured upon the knuckle or stub shaft 7 in any suitable and well known manner.

Mounted upon the inner side of the spokes 10 of the wheel 9 and secured thereon in any suitable manner is the brake drum 11 including an annular body portion secured to the spokes 10 and an outwardly directed or right angled annular flange 12. Positioned upon the inner face of the main or body portion of the brake drum 11 is a circular brake band 13 which is cut partly therethrough at its lower side as at 14 to provide resiliency, while the upper ends of said brake band 13 are spaced slightly from one another. Secured to the band 13 at the lower side thereof is a short supporting rod 15 which projects outwardly from and at right angles to the brake band 13 and is pivoted to the forward or outer ends of a longer supporting rod 16, as shown at 17, the rod 16 being extended through the lower eye 18 of the main section 19 of a vertical supporting bearing which is mounted upon the axle 2 and clamped thereon by suitable upper and lower clamp bolts 20 passed through the reduced portions of the main member 19 of the supporting bearing and through the opposite reduced ends of the smaller or secondary member 21 of said vertical supporting bearing, the central portions of said members 19 and 21 being widened and provided with suitable rectangular openings in their inner faces which register to accommodate the axle 2. The central portion of the member 19 is connected with the lower eye 18 and the upper eye 22 thereof by the reduced portions of said member 19.

Slidable through the upper eye 22 is an operating rod 23, to the inner end of which is connected a lever 24 which is extended downwardly at right angles to said rod 23 and adapted to be connected with suitable mechanism, not shown, for applying the brake or tightening the brake band 13 against the inner face of the flange 12 of the brake drum 11. This application of the brake is accomplished by swinging movement of the lever 24 to revolve the operating rod 23 and thereby rotate a short expander rod 25 which is connected with the outer end of the rod 23 by a universal joint connection 26. The rod 25 carries an angular head or expander 27 upon its outer end and said head engages the spaced ends of the brake band section 13, the expander 27 being preferably of rectangular form in general outline. By rotation of the rod 23 and handle 25, the expander 27 will be turned between the spaced ends of the brake band 13 to force the same away from one another and thereby tighten said brake band 13 against the inner face of the flange 12 of the brake drum 11 to retard the rotation of the wheel 9.

It will be readily seen that owing to the hinge connection 17 and the universal joint 26, the turning of the wheel 9 will not interfere with the application of the brake. Collars 28 are mounted upon the rods 15 and 25 so as to prevent derangement of the apparatus, the collars engaging the brake band.

Carried by the band 13 adjacent to one end thereof is an expander supporting finger 29 which is located below the ends of the band and in engagement with said ends, also the head or expander 27. The finger 29 supports the head or expander in position between the free ends of the band.

Referring particularly to Figs. 4, 5, and 6, it will be seen that I have mounted upon the flange 33 of the drum 30 a contraction brake band 42 of the split type and which has its ends formed with pairs of spaced apertured ears 43. This band 42 is to engage with the outer face of the flange 12 and mounted between the ears 43 on the ends thereof are screw supporting rollers 44. Inserted through the rollers 44 at right angles thereto are operating screws 45 formed with apertured and enlarged heads 46. The screws 45 are adjustable relative to the rollers 44 and have their heads opposed but slightly spaced from one another. Inserted through the heads 46 are the ends of the forked portions 47 of a contraction rod 48. This rod 48 corresponds to the one 25 and is pivotally connected as at 49 to an operating rod 50 therefor. The rod 50 is journaled in the upper end of the supporting bearing 19 and carries a depending operating lever 51. The lever 51 is arranged adjacent to the one 24 and is adapted to be connected with suitable operating mechanism therefor, not shown. An expander supporting finger 29 is carried by the band 13 and is arranged to support the expander head 27, said finger 29 being disposed between the free ends of the band in engagement with the head 35. Supporting rods 53 are secured to and extend outwardly from the lower end of the bearing 19 and is pivotally connected as at 54 with a short supporting rod 55 which is secured to the band 42 at the lower side of said band. These rods 53 and 55 serve to brace or support the band and coöperating structure and in being pivoted as at 54 do not interfere with the movement of the wheel relative to the axle.

It will be seen that when both levers 51 and 24 are rocked the bands 13 and 42 will be expanded and contracted so as to bind against the flange 12 on the brake drum 11. With this double band arrangement a very effective braking action may be had but if desired, the inner band 13 may be dispensed with, or, in other words only one band used as in the preferred form.

While I have shown and described the preferred embodiment of my invention, it will be understood that minor changes in the details of construction, combination and arrangement of parts may be made without departing from the spirit and scope of the invention as claimed or sacrificing any of the advantages thereof.

What is claimed is:—

In a vehicle brake, the combination with a vehicle wheel, and an axle therefor; of a brake drum including an outwardly directed flange fixed to said wheel; a bearing member fixed to said axle adjacent the end thereof and extending upwardly and downwardly therefrom; a rod carried by the lower end of said bearing member; a rod fixed to said band and being pivotally connected with said last mentioned rod; a rotatable element disposed at the ends of the band arranged to move the ends of the band relatively to one another upon rotation thereof; a rotatable rod connected to the rotatable element and a rotatable operating rod carried at the upper end of the bearing member and pivotally connected with said last mentioned rod.

In testimony whereof I affix my signature in presence of two witnesses.

JOHN PH. WEBER.

Witnesses:
 STANLEY H. MILLER,
 DOUGLAS M. SHAW.